(12) United States Patent
Bray

(10) Patent No.: US 8,146,795 B2
(45) Date of Patent: Apr. 3, 2012

(54) METHOD OF FRICTION WELDING

(75) Inventor: Simon E. Bray, Derby (GB)

(73) Assignee: Rolls-Royce PLC, London (GB)

( * ) Notice: Subject to any disclaimer, the term of this patent is extended or adjusted under 35 U.S.C. 154(b) by 28 days.

(21) Appl. No.: 12/309,234

(22) PCT Filed: Jul. 11, 2007

(86) PCT No.: PCT/GB2007/002612
§ 371 (c)(1),
(2), (4) Date: Jan. 12, 2009

(87) PCT Pub. No.: WO2008/017800
PCT Pub. Date: Feb. 14, 2008

(65) Prior Publication Data
US 2009/0314823 A1  Dec. 24, 2009

(30) Foreign Application Priority Data
Aug. 8, 2006  (GB) .................................. 0615671.5

(51) Int. Cl.
*B23K 20/12* (2006.01)
(52) U.S. Cl. .................................. 228/112.1; 228/2.1
(58) Field of Classification Search ............... 228/112.1, 228/2.1
See application file for complete search history.

(56) References Cited

U.S. PATENT DOCUMENTS

| | | |
|---|---|---|
| 4,903,887 A | 2/1990 | Thrower |
| 2003/0223873 A1 | 12/2003 | Carrier |
| 2004/0238599 A1* | 12/2004 | Subramanian et al. .... 228/112.1 |
| 2005/0205644 A1 | 9/2005 | Meier |

FOREIGN PATENT DOCUMENTS

| | | |
|---|---|---|
| EP | 0 513 669 A2 | 11/1992 |
| EP | 513669 A2 * | 11/1992 |
| EP | 0 850 718 A1 | 7/1998 |

(Continued)

OTHER PUBLICATIONS

Machine Translation of EP 513669 Searle et al. Retrieved from EPO website.*

(Continued)

*Primary Examiner* — David Sample
*Assistant Examiner* — Megha Mehta
(74) *Attorney, Agent, or Firm* — Oliff & Berridge, PLC

(57) ABSTRACT

A method of friction welding comprises providing a first workpiece having a first weld surface and a second workpiece having a second weld surface. The first workpiece is arranged such that it tapers away from the first weld surface, the first workpiece converges in a direction away from the first weld surface. The first and second workpieces are arranged such that the first weld surface abuts the second weld surface. The first and second workpieces are oscillated relative to each other such that at least one of the weld surfaces of at least one of the workpieces moves relative to the other weld surface of the other workpiece such that the temperature increases at the weld surfaces to create a weld interface. The oscillation is stopped and the first and second weld surfaces are allowed to cool to weld the first and second workpieces together. The tapering of the first workpiece reduces the flow rate of weld flash material during the oscillation of the first and second workpieces relative to each other to reduce the formation of strain-induced porosity at the edges of the weld.

21 Claims, 3 Drawing Sheets

FOREIGN PATENT DOCUMENTS

| | | | |
|---|---|---|---|
| EP | 0 887 143 | A1 | 12/1998 |
| EP | 1 239 116 | A3 | 2/2004 |
| EP | 1 323 490 | A3 | 11/2004 |
| EP | 1 495 829 | A1 | 1/2005 |
| EP | 1 555 081 | A1 | 7/2005 |

OTHER PUBLICATIONS

Wanjara et al., "Process Optimization for Linear Friction Welding of Ti6A14V," *ASM Proceedings of the 7th International Conference: Trends in Welding Research* (2005), pp. 855-860.

\* cited by examiner

METHOD OF FRICTION WELDING

The present invention relates to a method of friction welding and in particular to a method of linear friction welding.

Strain induced porosity (SIP) is a common issue in the forging of titanium, or aluminium alloys, to high strains and/or at high strain rates over a critical temperature range. Strain induced porosity (SIP) forms due to cavitation of material flow around second phase precipitates, in the case of titanium alloys the strain-induced porosity is due to cavitation around primary alpha grains. Strain induced porosity formation diagrams are available for various alloys and these diagrams show the strain and temperature regimes where strain induced porosity may occur. Strain induced porosity generally forms at a particular range of strain rates and at particular temperature ranges. Strain induced porosity is also known as cavitation.

During linear friction welding of titanium alloys, e.g. Ti 64, which comprises 6 wt % aluminium, 4 wt % vanadium and the balance titanium plus incidental impurities, strain induced porosity can be formed at the edges of the weld plane. During linear friction welding the conditions are such that there is a high strain rate at the edges of the friction weld, which produces strain induced porosity, and there is a lower strain rate at the centre of the friction weld, which does not produce porosity. There is no known method to control the formation of strain-induced porosity during linear friction welding.

Linear friction welding is used to weld fan blades to a fan disc, or compressor blades to a compressor disc, to form an integrally bladed disc of a gas turbine engine. The fan blades and fan disc generally comprise a titanium alloy and it has been found that strain induced porosity is predominantly formed on the fan disc rather than the fan blade due to the microstructure of the disc being more susceptible to strain induced porosity. The strain induced porosity forms at the edges of the primary alpha grains in the titanium alloy.

An edge clean up machining process follows the linear friction welding to remove material from the linear friction weld and the components, blades and disc, are provided with a material machining allowance such that the material allowance is large enough to ensure that all the strain induced porosity is removed from the final component, the final integrally bladed disc. However, this means that the weld areas on the blades and disc must be larger, requiring greater welding forces and hence requiring linear friction welding tools and linear friction welding machines capable of providing the greater linear friction welding forces. This will of course increase the costs of the linear friction tools and linear friction-welding machine. In addition the requirement for a large material allowance necessitates the use of increased forging sizes to produce the disc, with an increase in material cost and may limit non-destructive examination.

Accordingly the present invention seeks to provide a novel method of friction welding, which reduces, preferably overcomes, the above-mentioned problem.

Accordingly the present invention provides a method of friction welding comprising providing a first workpiece having a first weld surface and a second workpiece having a second weld surface, arranging the first workpiece such that the first workpiece tapers away from the first weld surface, the first workpiece converging in a direction away from the first weld surface, positioning the first and second workpieces such that the first weld surface of the first workpiece abuts the second weld surface of the second workpiece, oscillating the first and second workpieces relative to each other such that at least one of the weld surfaces of at least one of the workpieces moves relative to the other weld surface of the other workpiece such that the temperature increases at the weld surfaces to create a weld interface, stopping the oscillating and allowing the first and second weld surfaces of the first and second workpieces to cool to weld the first and second workpieces together, the tapering of the first workpiece reducing the flow rate of weld flash material during the oscillating of the first and second workpieces relative to each other to reduce the formation of strain induced porosity at the edges of the weld and/or to reduce cracking at the edges of the weld.

Preferably arranging the second workpiece such that the second workpiece tapers away from the second weld surface, the second workpiece converging in a direction away from the second weld surface.

Preferably the first workpiece is a rotor and the second workpiece is a rotor blade. Preferably the rotor is a fan disc and the blade is a fan blade. The rotor may be a compressor disc, or a compressor drum, and the blade is a compressor blade.

Preferably the titanium alloy comprises 6 wt % aluminium, 4 wt % vanadium and the balance titanium plus minor additions and incidental impurities.

Alternatively the titanium alloy comprises 6 wt % aluminium, 2 wt % tin, 4 wt % vanadium, 6 wt % molybdenum and the balance titanium plus minor additions and incidental impurities.

Alternatively the first workpiece is a rotor and the second workpiece is a rotor post. The rotor may be a turbine rotor and the rotor post is a turbine rotor post.

Preferably the oscillating motion of the first and second workpieces comprises a linear motion.

Preferably the method comprises friction welding a plurality of second workpieces onto the first workpiece.

Preferably the first workpiece comprises at least one outwardly extending portion and the first weld surface is on the outwardly extending portion of the first workpiece.

Preferably the first workpiece comprises a plurality of outwardly extending portions, each outwardly extending portion of the first workpiece has a first weld surface and a plurality of second workpieces are friction welded to the first workpiece, each second workpiece is friction welded to a respective one of the outwardly extending portions.

Preferably the first workpiece has side surfaces arranged at an angle to the first weld surface and the angle is less than 90° and more than 45°.

Preferably the second workpiece has side surfaces arranged at an angle to the second weld surface and the angle is less than 90° and more than 45°.

The present invention also provides a method of friction welding comprising providing a first workpiece having a first weld surface and a second workpiece having a second weld surface, arranging the first workpiece such that the first workpiece tapers away from the first weld surface, the first workpiece converging in a direction away from the first weld surface, arranging the second workpiece such that the second workpiece tapers away from the second weld surface, the second workpiece converging in a direction away from the second weld surface, positioning the first and second workpieces such that the first weld surface of the first workpiece abuts the second weld surface of the second workpiece, oscillating the first and second workpieces relative to each other such that at least one of the weld surfaces of at least one of the workpieces moves relative to the other weld surface of the other workpiece such that the temperature increases at the weld surfaces to create a weld interface, stopping the oscillating and allowing the first and second weld surfaces of the first and second workpieces to cool to weld the first and second workpieces together, the tapering of the first and second workpieces reducing the flow rate of weld flash material during the oscillating of the first and second workpieces relative to each other to reduce the formation of strain induced porosity at the edges of the weld and/or to reduce cracking at the edges of the weld.

The present invention will be more fully described by way of example with reference to the accompanying drawings in which:—

Figure 1:
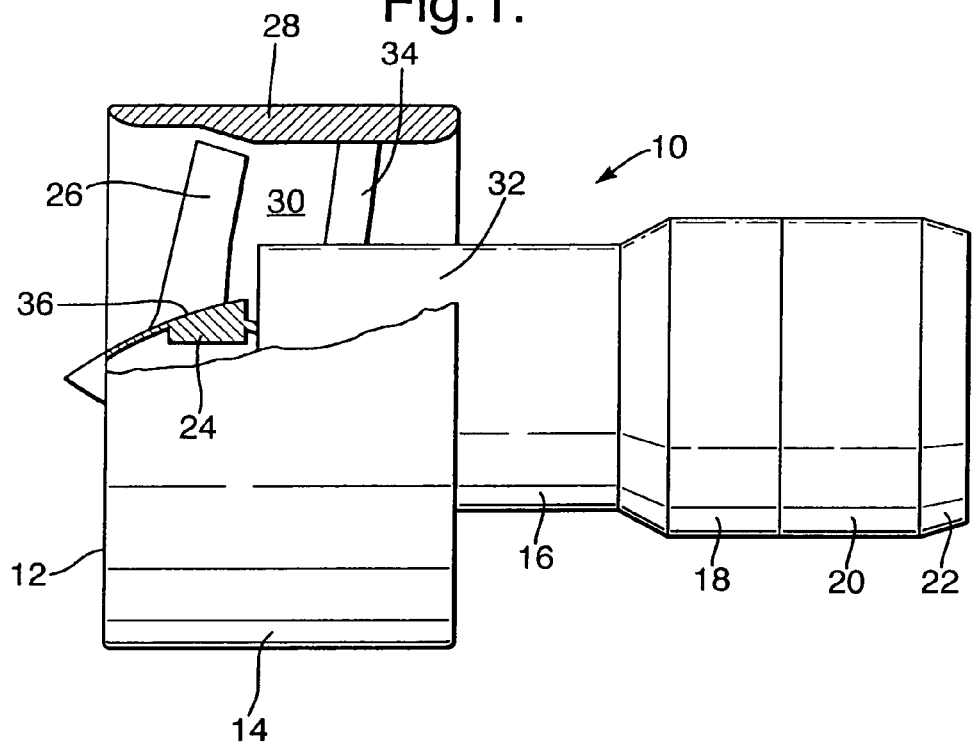
FIG. 1 shows a turbofan gas turbine engine having a rotor blade friction welded onto a rotor using a method of friction welding according to the present invention.

A turbofan gas turbine engine 10, as shown in FIG. 1, comprises in flow series an intake 12, a fan section 14, a compressor section 16, a combustion section 18, a turbine section 20 and an exhaust 22. The fan section 14 comprises a fan rotor 24 carrying a plurality of circumferentially spaced radially outwardly extending fan blades 26. The fan section 14 also comprises a fan casing 28, which is arranged coaxially with, and surrounds, the fan rotor 24 and the fan blades 26. The fan casing 28 defines a fan duct 30. The fan casing 28 is secured to a core engine casing 32 by a plurality of radially extending fan outlet guide vanes 34.

The compressor section 16 comprises one or more compressors, e.g. an intermediate pressure compressor (not shown) and a high pressure compressor (not shown) or a high pressure compressor (not shown). The turbine section 20 comprises a plurality of turbines, e.g. a low pressure turbine (not shown), an intermediate pressure turbine (not shown) and a high pressure turbine (not shown) or a low pressure turbine (not shown) and a high pressure turbine (not shown), to drive the fan and the compressor or compressors via shafts (not shown).

The fan blades 26 are integral with the fan rotor 24 and the fan blades 26 are joined to the fan rotor 24 by linear friction welds 36.

A method of friction welding a first workpiece, e.g. the fan rotor 24, to a second workpiece, e.g. the fan blades 26, is described with reference to FIGS. 2 and 3. The method of friction welding comprises providing the fan rotor 24 with a first weld surface 38 and the fan blade 26 with a second weld surface 40. The fan rotor 24 is arranged such that the fan rotor 24 tapers away from the first weld surface 38 and the fan blade is arranged such that the fan blade 26 tapers away from the second weld surface 40. The fan rotor 24 and fan blade 26 are positioned such that the first weld surface 38 of the fan rotor 24 abuts the second weld surface 40 of the fan blade 26. The fan rotor 24 and fan blade 26 are oscillated relative to each other such that at least one of the weld surfaces 38, 40 of at least one of the fan rotor 24 or fan blade 26 moves relative to the other weld surface 40, 38 of the fan blade 26 or fan rotor 24 such that the temperature increases at the weld surfaces 38, 40 to create a weld interface 42. The oscillation is stopped to allow the first and second weld surfaces 38 and 40 of the fan rotor 24 and fan blade 26 to cool to weld the fan rotor 24 and the fan blade 26 together. The tapering of the fan rotor 24 and the fan blade 26 reduces the flow rate of weld flash material 44 during the oscillation of the fan rotor 24 and the fan blade 26 relative to each other to reduce the formation of strain induced porosity at the edges of the weld interface 42.

The fan rotor 24 comprises at least one radially outwardly extending portion 46 and the first weld surface 38 is on the radially outwardly extending portion 46 of the fan rotor 24. Preferably the fan rotor 24 comprises a plurality of circumferentially spaced radially outwardly extending portions 46, each radially outwardly extending portion 46 of the fan rotor 24 has a first weld surface 38 and a plurality of fan blades 26 are friction welded to the fan rotor 24, each fan rotor 26 is friction welded to a respective one of the radially outwardly extending portions 46 of the fan rotor 24. The tapering of the fan rotor 24 is provided by tapering the radially outwardly extending portions 46 of the fan rotor 24. The radially outwardly extending portions 46 have tapering side surfaces 48 and 50, which converge in a direction away from the first weld surface 38 e.g. radially inwardly towards the axis of the fan rotor 24. The tapering side surfaces 48 and 50 are arranged at an angle $\alpha<90°$ relative to the first weld surface 38. The angle $\alpha$ relative to the first weld surface 38 is in the range $\alpha<90°$ to $\alpha>45°$ for example $\alpha=60°$.

The fan blade 26 comprises a base portion 52 and the second weld surface 40 is a radially inner surface of the fan blade 26. The tapering of the fan blade 26 is provided by tapering the base portion 52 of the fan blade 26. The base portion 52 has tapering side surfaces 54 and 56, which converge in a direction away from the second weld surface 40 e.g. radially outwardly away from the axis of the fan rotor 24. The tapering side surfaces 54 and 56 are arranged at an angle $\beta<90°$ relative to the second weld surface 40. The angle $\beta$ relative to the second weld surface 40 is in the range $\beta<90°$ to $\beta>45°$ for example $\beta=60°$.

The provision of the tapering outwardly extending portion 46 on the fan rotor 24 and the tapering base portion 52 on the fan blade 26 opens up the weld seam outlet and this reduces the flow rate of material at the edge of the weld interface and thus avoids the high strain rate conditions required to form strain induced porosity (SIP). The reduction in strain induced porosity (SIP) results in higher quality friction welds and potentially reduces edge clean up machining processes.

The oscillating motion is in the direction of arrows O, e.g. in a circumferential or tangential direction, if the first and second weld surfaces 38 and 40 of the fan rotor 24 and fan blade 26 are curved.

The tapering side surfaces 48 and 50 on the tapering outwardly extending portions 46 on the fan rotor 24 preferably extend only a radial distance D from the first weld surface 38. The radial distance D is equivalent to the expected upset distance from the first weld surface 38 for the tapering outwardly extending portions 46 of the fan rotor 24, e.g. the distance of lost material from the first weld surface 38 of the tapering outwardly extending portions 46 in the direction perpendicular to the weld plane, and may include a small extra distance to take into manufacturing tolerances, for example 2 mm to 5 mm.

The remainder of the outwardly extending portions 46 then blends smoothly into the fan rotor 24. The remainder of the outwardly extending portions 46 have tapering side surfaces 49 and 51, which diverge in a direction away from the first weld surface 38 e.g. radially inwardly towards the axis of the fan rotor 24.

Similarly the tapering side surfaces 54 and 56 on the tapering base portions 52 on the fan blades 26 preferably extend only a radial distance E from the second weld surface 40. The radial distance E is equivalent to the expected upset distance from the first second surface 40 for the tapering base portion 52 of the fan blades 26, e.g. the distance of lost material from the second weld surface 40 of the tapering base portion 52 in the direction perpendicular to the weld plane, and may include a small extra distance to take into manufacturing tolerances, for example 2 mm to 5 mm.

The remainder of the base portions 52 of the fan blade 26 have tapering side surfaces 55 and 57, which diverge in a direction away from the second weld surface 40 e.g. radially outwardly away from the axis of the fan rotor 24.

Figure 4:
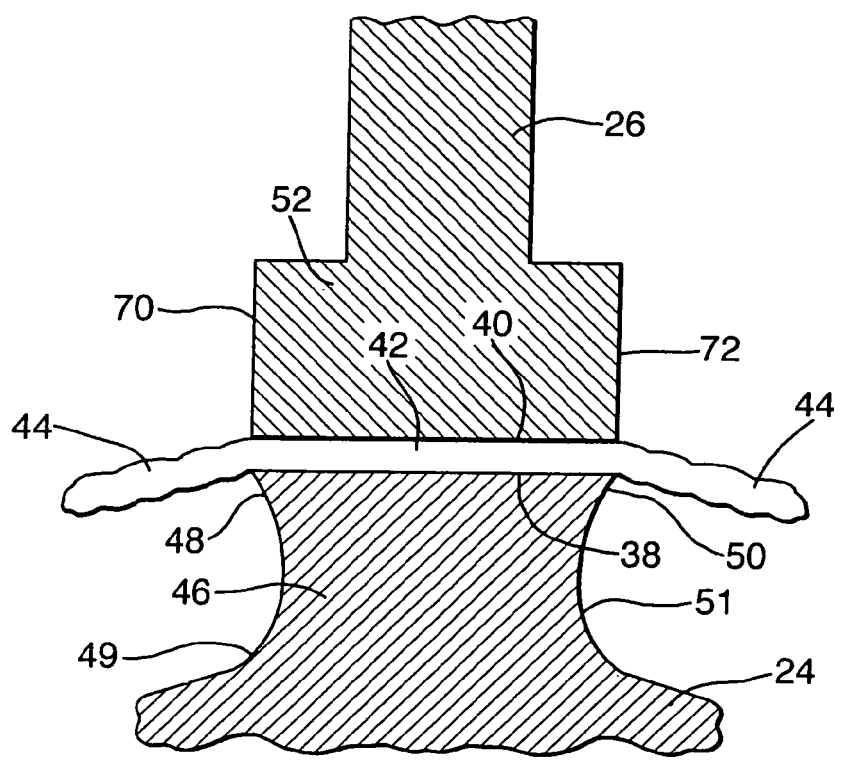
FIG. 4 shows an end view of first and second workpieces undergoing friction welding according to an alternative embodiment of the present invention.

A further embodiment of the present invention is shown in FIG. 4. In this embodiment the tapering outwardly extending portions 46 on the fan rotor 24 are the same as those in FIG. 2. The base portions 52 of the fan blades 26 are provided with side surfaces 70 and 72, which are arranged perpendicularly to the second weld surface 40.

Figure 5:
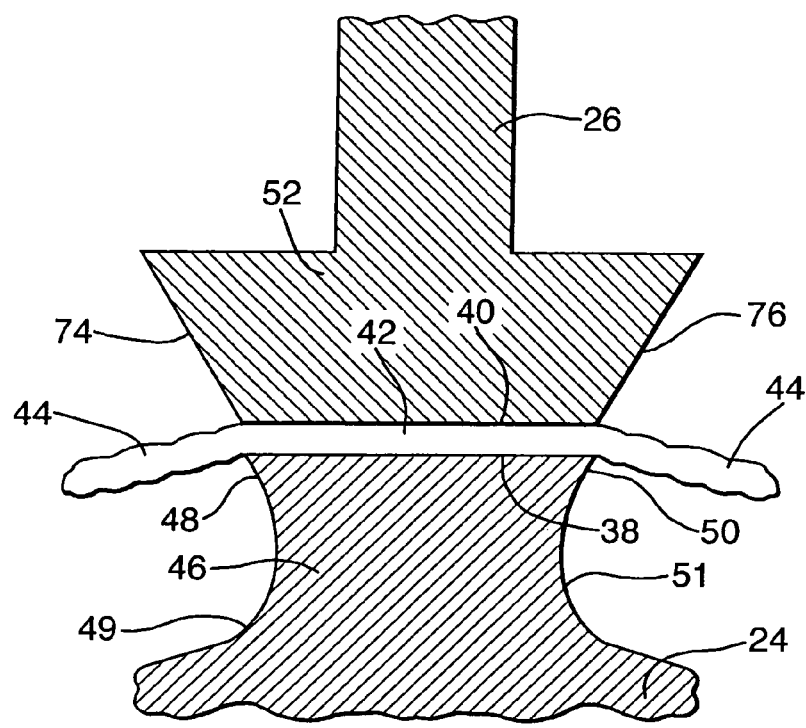
FIG. 5 shows an end view of first and second workpieces undergoing friction welding according to a further embodiment of the present invention.

A further embodiment of the present invention is shown in FIG. 5. In this embodiment the tapering outwardly extending portions 46 on the fan rotor 24 are the same as those in FIG. 2. The base portions 52 of the fan blades 26 are provided with tapering side surfaces 74 and 76, which diverge in a direction away from the second weld surface 40 e.g. radially outwardly away from the axis of the fan rotor 24.

Figure 6:
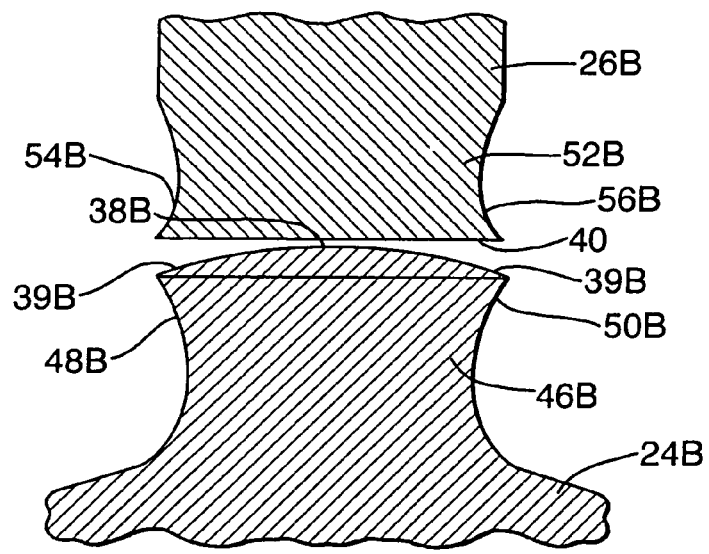
FIG. 6 shows an end view of first and second workpieces undergoing friction welding according to another embodiment of the present invention.

Another embodiment of the present invention is shown in FIG. 6. In this embodiment the tapering outwardly extending portions 46B on a turbine rotor 24B are similar to those in FIG. 2. The tapering outwardly extending portion 46B is provided with a first weld surface 38B, which is about 1 mm in width. There are two tapering surfaces 39A and 39B from the first weld surface 38B to the tapering side surfaces 48B and 50B. The base portions 52B of a turbine rotor post 26B are provided with tapering side surfaces 54B and 56B, which diverge in a direction away from the second weld surface 40 e.g. radially outwardly away from the axis of the turbine rotor 24B. The turbine rotor posts 26B are subsequently machined to form firtree shaped slots in the rim of the turbine rotor 24B.

Figure 2:
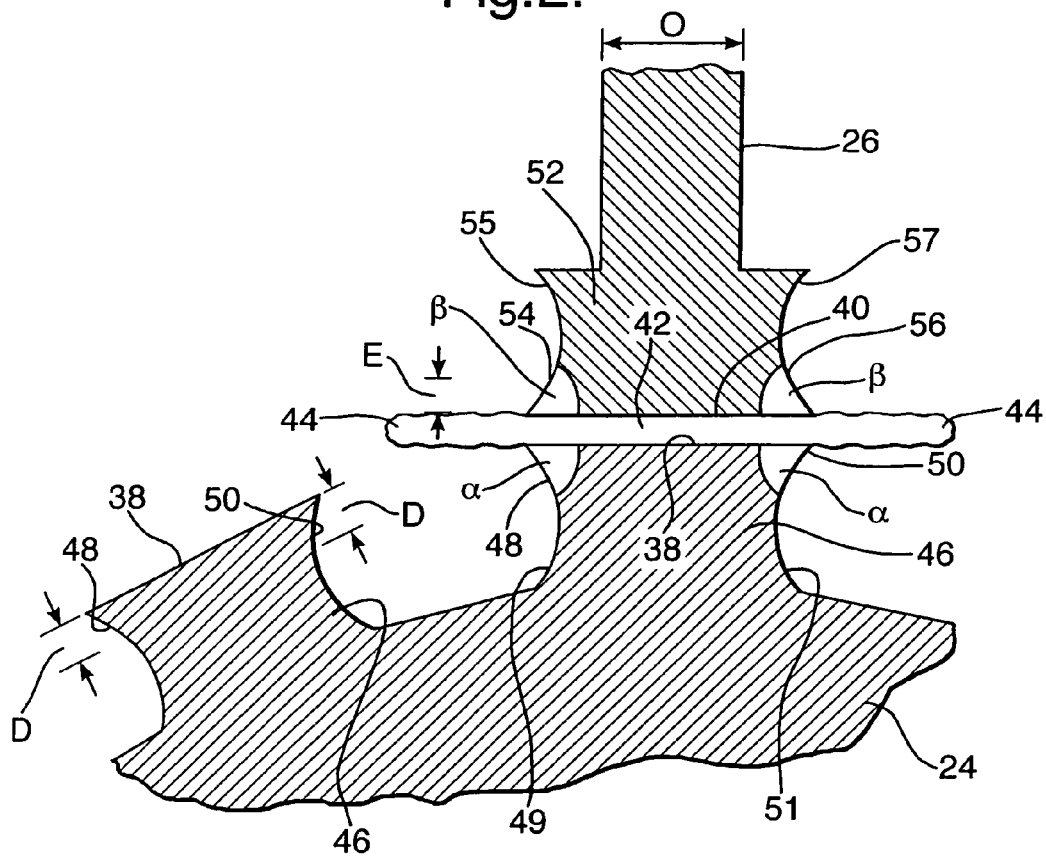
FIG. 2 shows an end view of first and second workpieces undergoing friction welding according to the present invention.

The embodiment in FIG. 2 may be used for friction welding workpieces of the same metal or alloy, for example Ti 64 titanium alloy fan blade to a Ti 64 titanium alloy fan rotor, where the Ti 64 titanium alloy comprises 6 wt % aluminium, 4 wt % vanadium and the balance titanium plus minor additions and incidental impurities, or a Ti 6246 compressor blade to a Ti 6246 compressor rotor, where the Ti 6346 titanium alloy comprises 6 wt % aluminium, 2 wt % tin, 4 wt % vanadium, 6 wt % molybdenum and the balance titanium plus minor additions and incidental impurities. The Ti 64 titanium alloy rotor is susceptible to formation of strain-induced porosity because it has a different microstructure to the titanium alloy blade. The Ti 6246 titanium alloy rotor and Ti 6246 titanium alloy blade are both susceptible to formation of strain-induced porosity.

Figure 3:
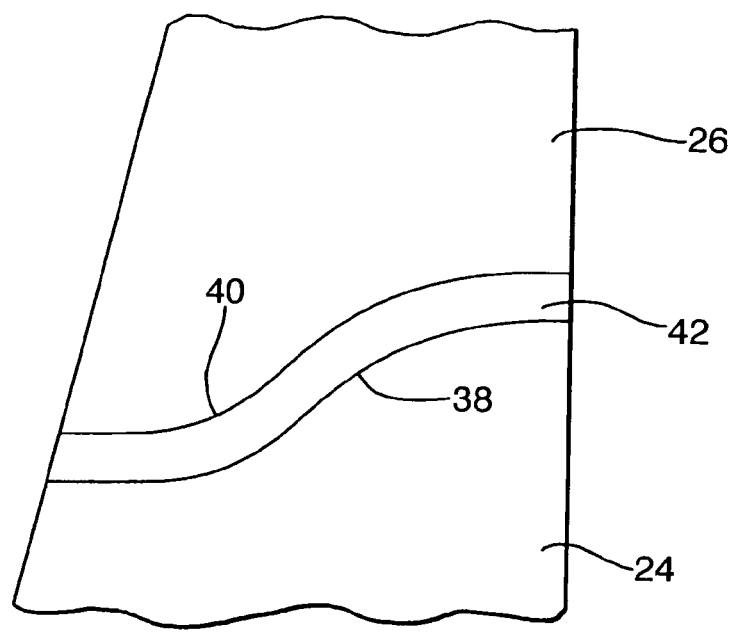
FIG. 3 shows a side view of a curvilinear weld plane between the first and second workpieces undergoing friction welding in FIG. 2.

The embodiments in FIGS. 3 and 4 may be used for friction welding workpieces of different metals or alloys, for example welding Ti 64 rotor blade to a Ti 6246 rotor or a Ti 6246 rotor blade to a Ti 64 rotor.

However, the oscillating motion may be in a direction into and out of the page, e.g. in an axial direction, if the first and second weld surfaces 38 and 40 of the fan rotor 24 and fan blade 26 are straight in a direction into and out of the page e.g. in an axial direction.

Although the present invention has been described with reference to friction welding a fan blade to a fan rotor, fan disc, the present invention is equally applicable to friction welding a compressor blade to a compressor disc, or a compressor drum. The present invention is also applicable to friction welding a turbine blade to a turbine disc or a turbine disc post to a turbine disc.

Preferably the first workpiece and the second workpiece comprise a titanium alloy. Preferably the titanium alloy comprises 6 wt % aluminium, 4 wt % vanadium and the balance titanium plus minor additions and incidental impurities. The titanium alloy may comprise 6 wt % aluminium, 2 wt % tin, 4 wt % vanadium, 6 wt % molybdenum and the balance titanium plus minor additions and incidental impurities.

The first and second workpiece may comprise aluminium alloys, steel or nickel alloys. Aluminium alloys are susceptible to the formation of strain-induced porosity. The present invention is particularly applicable to alloys, which are susceptible to the formation of strain-induced porosity (SIP).

Preferably the oscillating motion of the first and second workpieces comprises a linear motion.

Preferably the method comprises friction welding a plurality of second workpieces onto the first workpiece.

The present invention is also applicable to any friction welding process for example rotary friction welding and for any material susceptible to the formation of strain-induced porosity (SIP).

It is believed that the present invention may also reduce cracking at the edges of the friction welds.

The invention claimed is:

1. A method of friction welding comprising:
providing a first workpiece having a first weld surface and a second workpiece having a second weld surface;
arranging the first workpiece such that the first workpiece tapers away from the first weld surface, where such tapering away begins at the first weld surface, the first workpiece converging in a first direction beginning at the first weld surface, the first direction being away from the first weld surface and away from the second workpiece;
positioning the first and second workpieces such that the first weld surface of the first workpiece abuts the second weld surface of the second workpiece;
oscillating the first and second workpieces relative to each other such that at least one of the weld surfaces of at least one of the workpieces moves relative to the other weld surface of the other workpiece such that temperature increases at the weld surfaces to create a weld interface; and
stopping the oscillating and allowing the first and second weld surfaces of the first and second workpieces to cool to weld the first and second workpieces together,
the first workpiece tapers to reduce a flow rate of weld flash material during the oscillating of the first and second workpieces relative to each other to reduce at least one of:
formation of strain induced porosity at edges of the weld and
cracking at the edges of the weld.

2. The method of claim 1, comprising arranging the second workpiece such that the second workpiece tapers away from the second weld surface, where such tapering away begins at the second weld surface, the second workpiece converging in a second direction beginning at the second weld surface, the second direction being away from the second weld surface.

3. The method of claim 1, wherein the first workpiece is a rotor and the second workpiece is a rotor blade.

4. The method of claim 3, wherein the rotor is a fan disc and the blade is a fan blade.

5. The method of claim 3, wherein the rotor is a compressor disc, or a compressor drum, and the blade is a compressor blade.

6. The method of claim 1, wherein the first workpiece and the second workpiece comprise a titanium alloy.

7. The method of claim 6, wherein the titanium alloy comprises 6 wt % aluminium, 4 wt % vanadium and the balance titanium plus minor additions and incidental impurities.

8. The method of claim 6, wherein the titanium alloy comprises 6 wt % aluminium, 2 wt % tin, 4 wt % vanadium, 6 wt % molybdenum and the balance titanium plus minor additions and incidental impurities.

9. The method of claim 1, wherein the first workpiece is a rotor and the second workpiece is a rotor post.

10. The method of claim 9, wherein the rotor is a turbine rotor and the rotor post is a turbine rotor post.

11. The method of claim 1, wherein the oscillating motion of the first and second workpieces comprises a linear motion.

12. The method of claim 1, wherein the method comprises friction welding a plurality of second workpieces onto the first workpiece.

13. The method of claim 1, wherein the first workpiece comprises at least one outwardly extending portion and the first weld surface is on the outwardly extending portion of the first workpiece.

14. The method of claim 13, wherein the first workpiece comprises a plurality of outwardly extending portions, each outwardly extending portion of the first workpiece has a first weld surface and a plurality of second workpieces are friction welded to the first workpiece, each second workpiece is friction welded to a respective one of the outwardly extending portions.

15. The method of claim 1, wherein the first workpiece has side surfaces arranged at an angle to the first weld surface and the angle is less than 90° and more than 45°.

16. The method of claim 1, wherein the second workpiece has side surfaces arranged at an angle to the second weld surface and the angle is less than 90° and more than 45°.

17. A method of friction welding comprising:
providing a first workpiece having a first weld surface and a second workpiece having a second weld surface;
arranging the first workpiece such that it tapers away from the first weld surface, where such tapering away begins at the first weld surface, the first workpiece converging in a first direction beginning at the first weld surface, the first direction being away from the first weld surface and away from the second workpiece;
positioning the first and second workpieces such that the first weld surface of the first workpiece abuts the second weld surface of the second workpiece; and
rotary friction welding the first and second workpieces together,
the first workpiece tapers to reduce a flow rate of weld flash material during the rotary friction welding of the first and second workpieces together to reduce at least one of:
formation of strain induced porosity at edges of the weld and
cracking at the edges of the weld.

18. The method of claim 1, wherein the first workpiece has side surfaces arranged at an angle to the first weld surface and the side surfaces extend only a limited distance from the first weld surface.

19. The method of claim 18, wherein the limited distance is an expected upset distance from the first weld surface.

20. The method of claim 2, wherein the second workpiece has side surfaces arranged at an angle to the second weld surface and the side surfaces extend only a limited distance from the second weld surface.

21. The method of claim 20, wherein the limited distance is an expected upset distance from the second weld surface.

* * * * *